Oct. 26, 1965  R. G. WILSON  3,214,566
OVEN WITH CIRCULATION OF HEATED AIR
Filed Dec. 6, 1962  2 Sheets-Sheet 1

INVENTOR.
ROBERT G. WILSON
BY
ATTORNEY

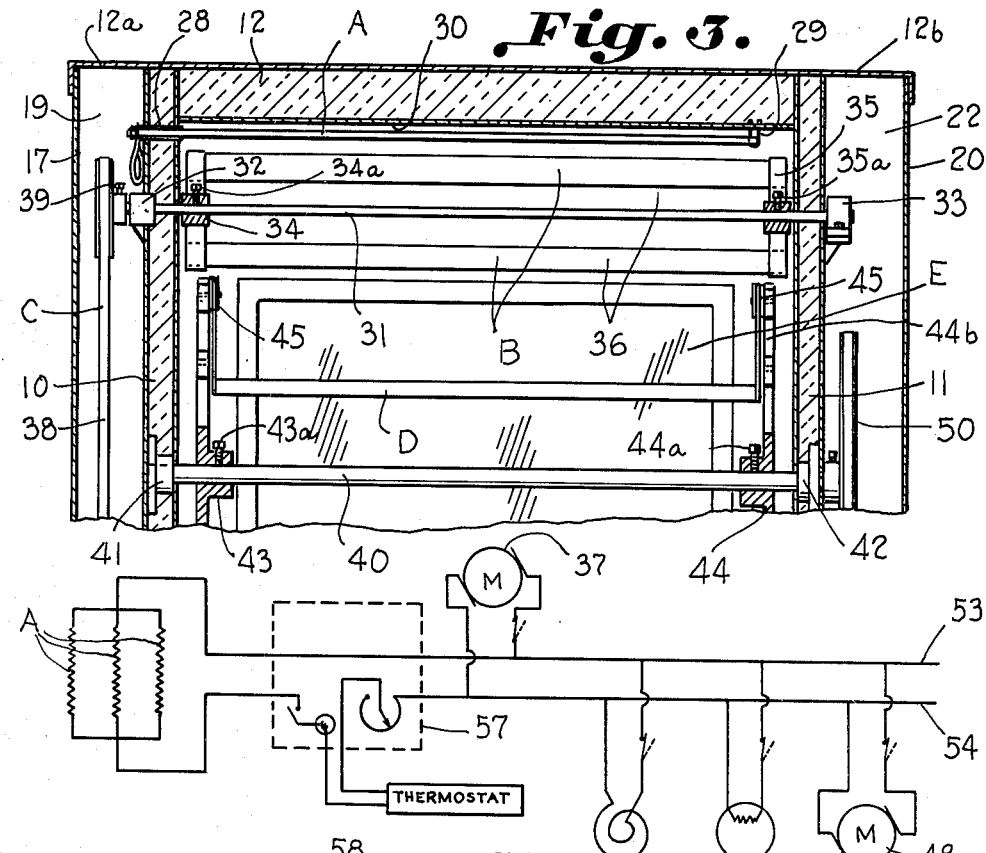
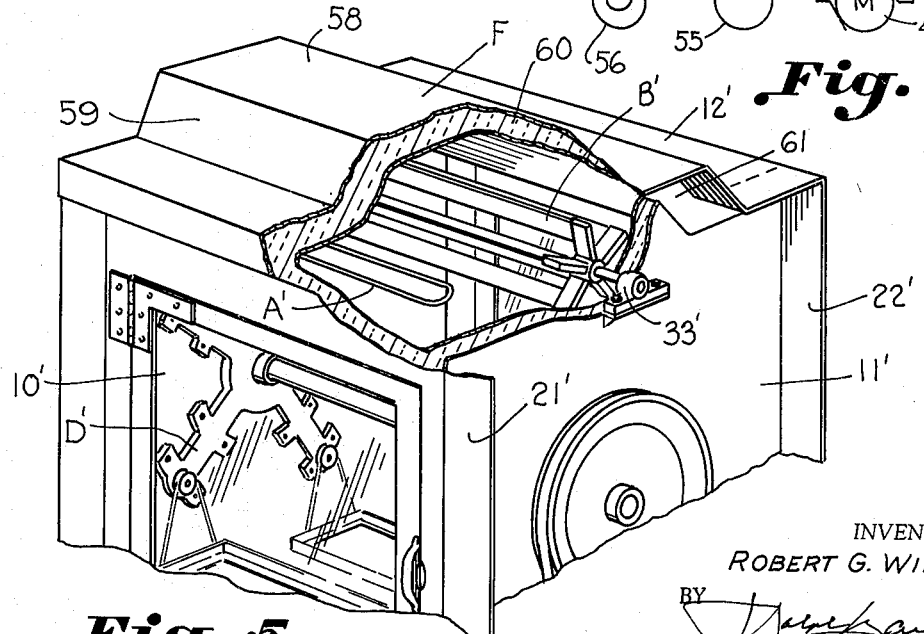

United States Patent Office 3,214,566
Patented Oct. 26, 1965

3,214,566
OVEN WITH CIRCULATION OF HEATED AIR
Robert G. Wilson, 643 E. Faris Road, Greenville, S.C.
Filed Dec. 6, 1962, Ser. No. 242,792
5 Claims. (Cl. 219—400)

This invention relates to the art of cooking and more especially to an enclosed oven having means circulating the heated air within the oven to maintain a substantially even temperature throughout the oven.

Attempts have been made to solve the problem of providing uniform heat throughout an electric oven, but these have failed to provide an adequate solution to the problem. Such attempts have included the use of fans of the usual types having blades rotated about an axis perpendicular thereto discharging air over heating elements and into the oven, but such heating means were localized and failed to spread the heated air uniformly throughout the oven. Other attempts have included the circulation of heated air through duct means from the top to the bottom of the oven, but such attempts have not completely solved the problem due to the difficulty of installing the ducts which present disadvantages which tend to counterbalance the advantages achieved thereby. The present invention contemplates a horizontal elongated fan blade positioned adjacent the top and substantially across an oven such as that illustrated in United States Patent No. 2,722,882 entitled Barbecue Machine issued November 8, 1955 to the present inventor.

Accordingly, it is an important object of this invention to provide a simple fan means for circulating heat within a cooking oven providing substantially uniform heat throughout the oven.

Another important object of the invention is to provide an oven having a rotatable eatable support assembly with heating means and fan means for insuring even browning of the eatables carried by the assembly.

Another object of the invention is to provide uniform heat within an oven carrying a rotatable eatable support in which glass doors are provided for observing the eatables during cooking in which the circulating heat prevents the condensation of moisture upon the glass.

The construction designed to carry out the invention will be hereinafter described, together with other features thereof.

Figure 1:
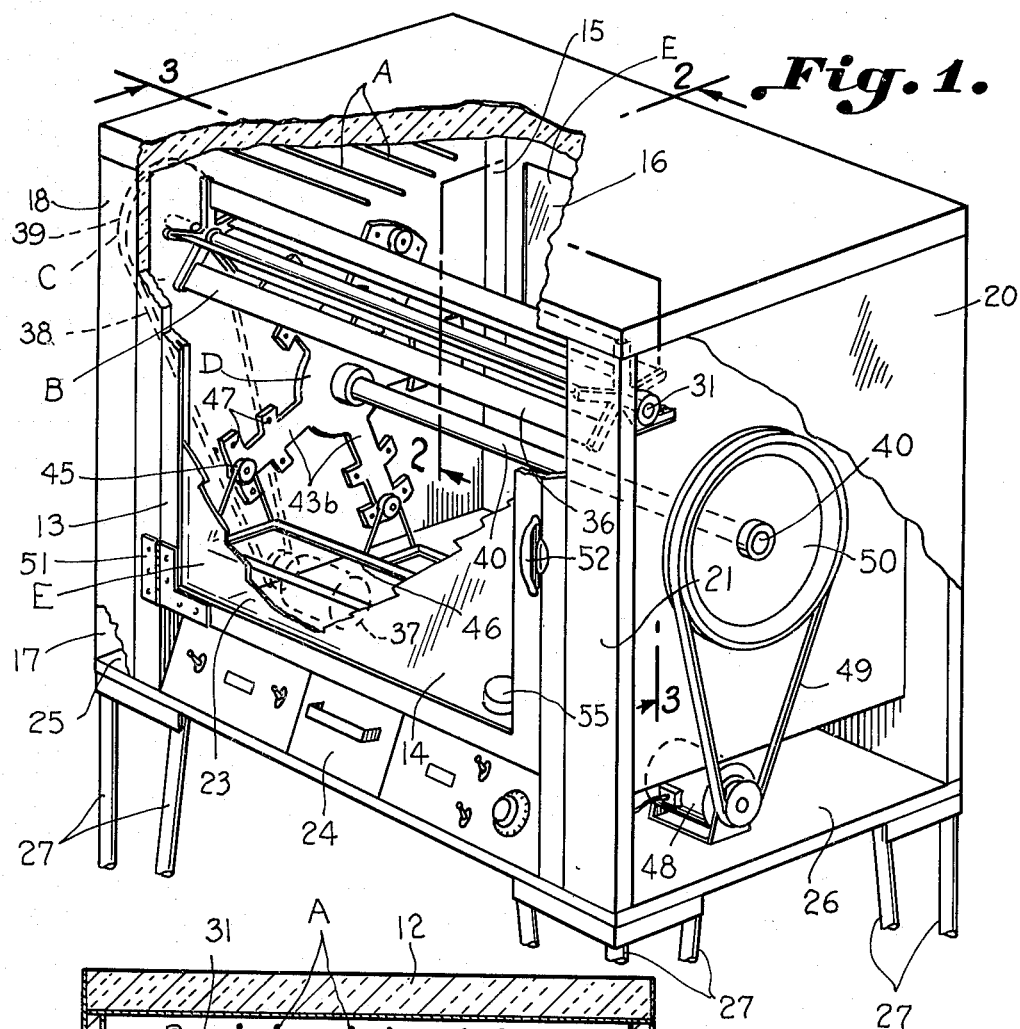
Figure 2:
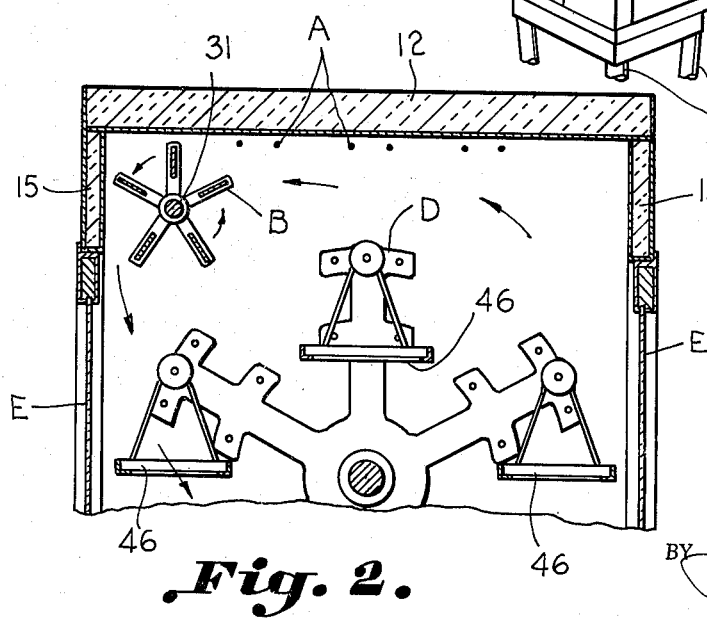

The invention will be more readily understood from a reading of the following specification and by reference to the accompanying drawings forming a part thereof, wherein an example of the invention is shown and wherein:

FIGURE 1 is a perspective view with parts broken away illustrating an oven constructed in accordance with the present invention, FIGURE 2 is an enlarged transverse sectional view taken on the line 2—2 in FIGURE 1, FIGURE 3 is an enlarged longitudinal sectional view taken on the line 3—3 in FIGURE 1, FIGURE 4 is a circuit diagram illustrating the interrelations of the various electrical components of the device, and FIGURE 5 is a perspective view illustrating an oven constructed in accordance with a modified form of the invention with parts broken away.

The drawings illustrate an oven having heating elements A positioned adjacent the top thereof, and extending substantially across the oven. It is to be understood that the heating elements A may be arranged in another manner to extend substantially across the oven, such as by spacing a number of transverse heating elements to provide substantially uniform heat in the upper portion of the oven. An axially elongated centrifugal impeller or parallel-blade fan B is positioned adjacent the heating elements so that its longitudinal axis extends across the oven substantially coextensively with the heating elements A. Driving means C are provided for rotating the parallel-blade fan about its longitudinal axis to cause the heated air around the heating means A to be circulated throughout the oven thus maintaining a substantially even temperature throughout the oven. The oven includes a rotatable assembly D for positioning eatables for rotation within the oven and glass doors E are provided for inspecting the eatables during cooking. Preferably, the parallel-blade fan B turns in the direction of the arrows in FIGURE 2 to pull air across the heating elements A and discharge same downwardly between the rotatable support D and the adjacent glass door E. The heated air would then pass beneath the eatable support D and upwardly between the passageway defined between the opposite side of the support D and its adjacent door E.

The oven of the present invention includes an insulated enclosed housing having insulated side walls 10 and 11, and an insulated top 12. A front wall 13 carries one of the doors E having a glass 14 therein. A rear wall 15 carries the opposite door E having a glass 16 therein. It will be noted that the insulated top 12 has overhanging portions 12a and 12b extending over the walls 10 and 11 respectively. The overhanging portion 12a together with a spaced side wall 17 and front and rear walls 18 and 19 form a compartment for housing driving means for the fan B. Another compartment is formed by the overhanging portion 12b with an outside wall 20 and front and rear walls 21 and 22, respectively, for containing the driving means for the eatable assembly D. The oven housing is provided with a suitable base portion 23 having drainage means (not shown) for collecting drippings from the eatables and disposing same within a drawer 24 which may be removed for the purpose of emptying the drippings. The compartment containing the driving means for the fan has a suitable base 25, and the compartment containing the driving means for the eatable supporting assembly has a base 26. The entire oven may be supported by suitable means such as the legs 27 positioned adjacent each corner thereof.

The heating elements A may be in the form of rod like members which are fixed within the wall 10 within suitable mounting means 28 with suitable electrical connections provided. The other end of the heating elements are shown as being suspended by fastening elements 29 adjacent the ceiling 30 of the oven so that the heating elements extend substantially across the oven. As previously pointed out, the arrangement of the heating tubes is immaterial so long as a concentration of heat is provided within the top of the oven substantially uniformly across same.

The fan blade assembly B includes a centrally disposed shaft 31 carried by suitable bearings 32 and 33 mounted upon the walls 10 and 11, respectively. The shaft 31 has adjacent its ends spoke-type blade-supports 34 and 35, respectively, fixed upon the shaft 31 as by setscrews 34a and 35a, respectively. Longitudinal blade elements 36 are fixed as by welding (not shown) adjacent each of their ends between the supports 34 and 35 so as to be circumferentially spaced about the shaft 31. The driving means C for the fan includes a motor 37 which drives a belt 38 for turning the pulley 39 fixed to the shaft 31. Since the driving means C are positioned externally of the housing, they are not subjected to the damaging effects of the heat of the oven.

The rotatable eatable supporting assembly D includes a centrally disposed longitudinal shaft 40 carried within bearings 41 and 42 within the walls 10 and 11, respectively. The shaft 40 carries blade-supports 43 and 44 adjacent the walls 10 and 11, respectively. The blade-supports are adjustably fixed upon the shaft 40 by setscrews 43a and 44a. The blade-supports 43 and 44 are in the form of spiders carrying radially extending circumferentially arms 43b and 44b. The arms 43b and 44b have mountings 45 for carrying supports, illustrated in the form of trays 46 depending therefrom. It will be noted that apertures 47 are carried by the assembly for positioning spits, such as those illustrated in United States Patent No. 2,722,882 referred to above. The assembly D is rotated by the motor 48, which through the belt 49, drives the pulley 50 fixed adjacent the end of the shaft 40. The doors E are both hinged by means such as illustrated at 51, and provided with handles such as indicated at 52. The glass panels 14 and 16 are kept moisture free by the circulation of air resulting from the blowing of the fan B. It is important that these doors be maintained moisture free so that prospective customers may observe the cooking operation.

The circuit diagram (FIGURE 4) shows the motor 48 connected across the lines 53 and 54, which are connected across a suitable power source (not shown). A small heating element 55 positioned in the right-hand front corner of the machine for causing hickory chips to smoke when placed thereon, is also connected across the lines 53 and 54. An electric light 56 suitably positioned within the oven (not shown) is also connected across the lines 53 and 54. It will be noted that the heating means A are also connected in parallel across the lines 53 and 54. A thermostat 57 may be set to control the heating elements A to maintain a predetermined temperature within the oven. The motor 37 normally drives the fan B at all temperature settings upon actuation of the thermostat switch as actuation of the thermostat switch controls the operation of the motor 37. The switch shown schematically adjacent the motor in FIGURE 4 is built into the thermostat switch. Actuation of the thermostat to deenergize the heating means A does not affect the operation of the fan motor.

Referring now to FIGURE 5, a modified form of the invention is illustrated in which like reference characters are used to designate like parts with prime notations added. It will be noted that the fan means B' is moved to the central upper portion of the oven where a raised longitudinal compartment F is provided for housing the fan B' above the heating means A'. The housing F is, preferably centrally disposed, positioned within the top wall 12' which includes a raised central portion 58 and side walls 59 and 60. The side walls 10' and 11' have upper extensions 61 closing the ends of the compartment F. This arrangement of the fan B' causes air to be discharged therefrom downwardly, and causes air to be pulled thereto from the rear across the heating elements A'.

Thus, the circulation of air is extended uniformly substantially across the entire oven. The uniform browning of eatables may be assured while avoiding burning of those portions of the eatables facing the heating means without turning the eatables. Such uniform heating makes possible a versatile oven in which the rotatable support may be constructed to cook a large variety of eatables.

While two preferred embodiments of the invention have been described using specific terms, such description is for illustrative purposes only, and it is to be understood that changes and variations may be made without departing from the spirit or scope of the following claims.

What is claimed is:

1. In an oven having heating elements positioned adjacent the top thereof extending longitudinally substantially across the oven, a rotatable eatable supporting assembly positioned longitudinally within the oven below the heating elements and a glass door positioned longitudinally below the heating elements for observing the eatables being cooked, the improvement including, an axially elongated parallel-blade fan positioned in the top portion of the oven relatively close to the heating elements so that its longitudinal axis extends longitudinally across the oven substantially coextensively with the heating elements, and means driving said fan about its longitudinal axis blowing air between the rotatable eatable supporting assembly and the glass door, said fan being positioned relatively close to said door, whereby a substantially even temperature is maintained within the oven permitting even browning of eatables and there is a reduction of moisture collection on the door.

2. The structure set forth in claim 1, in which the fan is positioned between the heating elements and the glass door so as to discharge air directly between the glass door and the rotatable eatable supporting assembly.

3. An oven assembly including, an insulated enclosed housing, heating elements positioned within the top portion and extending substantially across the housing, an axially elongated parallel-blade fan positioned in the top portion of the oven relatively close to the heating elements so that its longitudinal axis extends across the housing substantially coextensively with the heating elements, an eatable supporting assembly positioned within the oven below the heating elements, a glass door positioned below the heating elements, and means positioned externally of the housing driving said fan about its longitudinal axis blowing air between said eatable supporting assembly and said door, said fan being positioned relatively close to said door, whereby a substantially even temperature is maintained within the oven and there is a reduction of moisture collection on the door.

4. In an oven having heating elements positioned adjacent the top thereof extending substantially across the oven, the improvement including, an elongated air compartment within said oven above the heating elements, an axially elongated parallel-blade fan positioned within the compartment close to the heating elements so that the longitudinal axis of the fan extends across the oven substantially coextensively with the heating elements, an eatable supporting assembly positioned within the oven below the heating elements, a glass door positioned below the heating elements, and means driving said fan about its longitudinal axis blowing air between said eatable supporting assembly and said door, said fan being positioned relatively close to said door, whereby a substantially even temperature is maintained within the oven and there is a reduction of moisture collection on the door.

5. The structure set forth in claim 4, in which the compartment is centrally disposed with respect to the oven and extends longitudinally thereof.

References Cited by the Examiner

UNITED STATES PATENTS

| | | |
|---|---|---|
| 1,765,247 | 6/30 | Seegmuller. |
| 1,827,194 | 10/31 | Grothe. |
| 2,064,498 | 12/36 | Shackford et al. _____ 219—203 X |
| 2,408,331 | 9/46 | Mills _____ 219—400 |
| 2,561,517 | 7/51 | Ladge _____ 219—428 X |
| 2,568,493 | 9/51 | Garrison _____ 219—276 X |
| 2,577,184 | 12/51 | Dietrich et al. _____ 219—405 X |
| 2,626,341 | 1/53 | Bolling _____ 219—395 |
| 2,722,882 | 11/55 | Wilson _____ 99—421 |

FOREIGN PATENTS

| | | |
|---|---|---|
| 1,121,675 | 5/56 | France. |
| 1,125,720 | 7/56 | France. |
| 872,601 | 7/61 | Great Britain. |

RICHARD M. WOOD, *Primary Examiner.*